(12) United States Patent
Price

(10) Patent No.: US 7,118,091 B2
(45) Date of Patent: Oct. 10, 2006

(54) TOOL FOR CONTROLLING WATER SUPPLY

(76) Inventor: Ron Price, P.O. Box 6330, Moreno Valley, CA (US) 92554

( * ) Notice: Subject to any disclaimer, the term of this patent is extended or adjusted under 35 U.S.C. 154(b) by 90 days.

(21) Appl. No.: 10/837,364

(22) Filed: Apr. 30, 2004

(65) Prior Publication Data

US 2004/0217316 A1    Nov. 4, 2004

Related U.S. Application Data

(60) Provisional application No. 60/467,406, filed on May 2, 2003.

(51) Int. Cl.
*B25B 21/00* (2006.01)
(52) U.S. Cl. .................. 251/293; 81/124.4; 81/125.1
(58) Field of Classification Search ............ 81/124.4, 81/125.1; 251/293
See application file for complete search history.

(56) References Cited

U.S. PATENT DOCUMENTS

| | | | | |
|---|---|---|---|---|
| 342,824 A * | 6/1886 | Clark | ...................... | 81/125.1 |
| 793,503 A * | 6/1905 | Bousser | ..................... | 81/124.5 |
| 1,770,621 A * | 7/1930 | McElwee, Sr. et al. | ........ | 29/270 |
| 2,054,978 A * | 9/1936 | Hoelscher | .................... | 403/306 |
| D370,606 S * | 6/1996 | Cole et al. | ..................... | D8/21 |
| 6,109,292 A * | 8/2000 | Fox | ........................... | 137/296 |
| 6,257,099 B1 * | 7/2001 | Rosenbaum | ............... | 81/124.4 |
| 6,314,841 B1 * | 11/2001 | Burk et al. | ................ | 81/125.1 |
| 6,349,622 B1 * | 2/2002 | Lemaire et al. | ........... | 81/124.4 |
| 6,364,285 B1 * | 4/2002 | Stinnett | ..................... | 251/293 |
| 6,776,068 B1 * | 8/2004 | Reuschel et al. | .............. | 81/54 |

* cited by examiner

Primary Examiner—J. Casimer Jacyna
(74) Attorney, Agent, or Firm—Marcia A Devon

(57) ABSTRACT

A tool for shutting off water supplies is disclosed. A variety of water supply valves can be controlled with a single too. The tool has different fittings on each end, such as wrenches. The wrenches may be of variable width to accommodate a large number of water supply valves. A bar is inserted into rings provided on the tool to provide substantial torque to open and close the water supply valves. The tool can be readily stored and carried on utility or fire trucks.

2 Claims, 2 Drawing Sheets

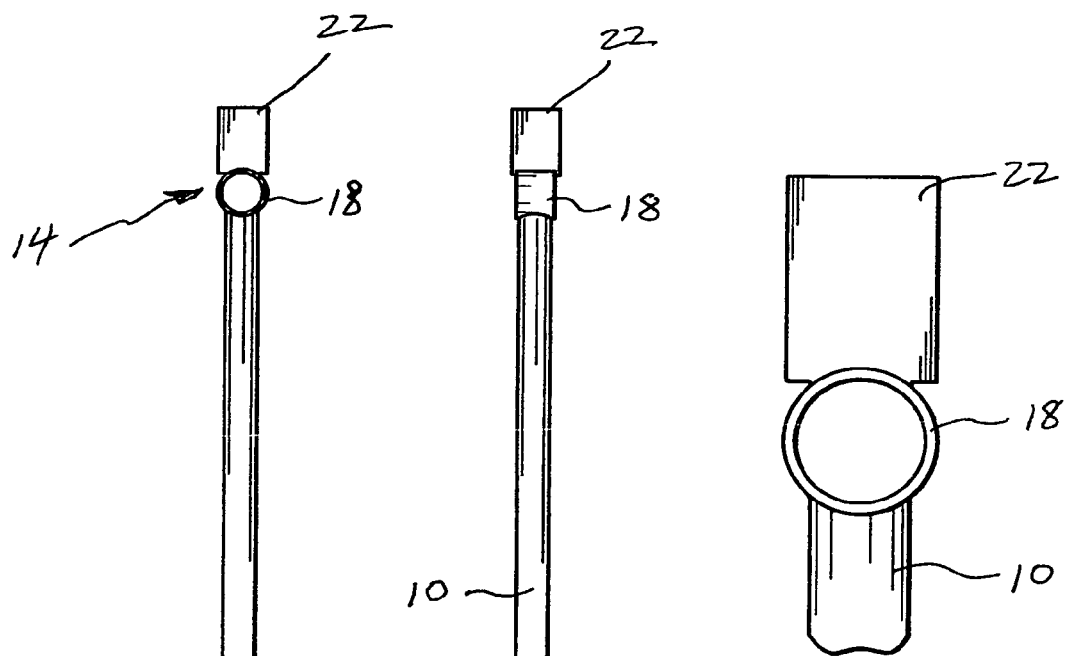
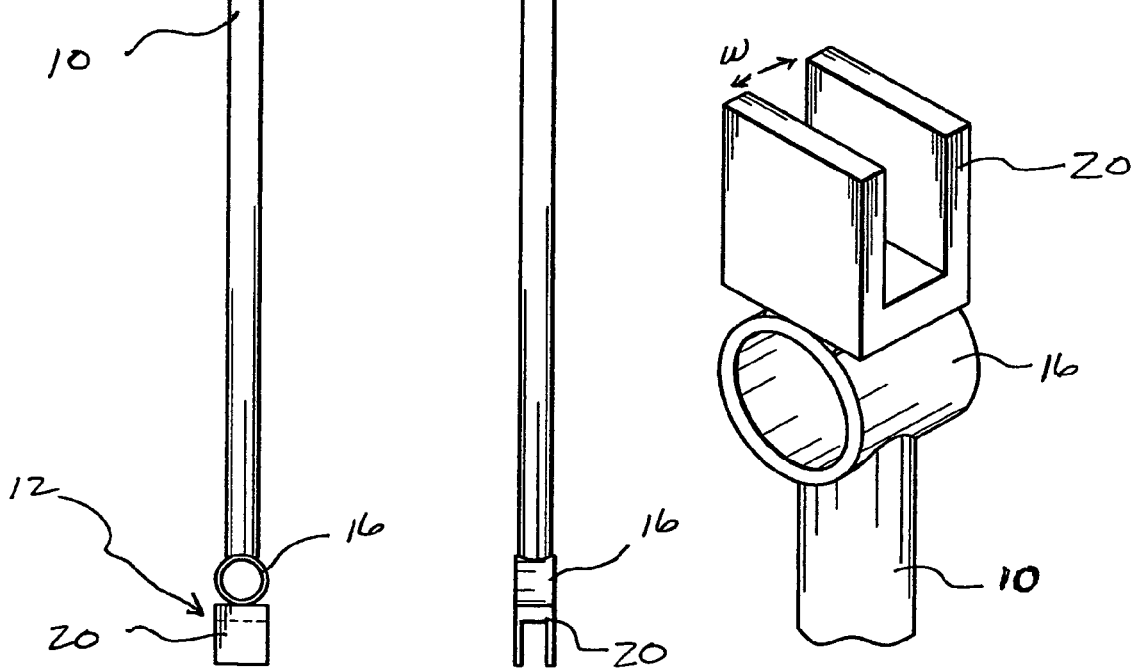
FIG. 2  FIG. 3  FIG. 4  FIG. 5

TOOL FOR CONTROLLING WATER SUPPLY

This Application claims the benefit pursuant to 35 U.S.C. 119(e) of U.S. Provisional Patent Application Ser. No. 60/467,406, filed by the applicant on May 2, 2003.

FIELD OF THE INVENTION

The present invention relates generally to tools for controlling valves, specifically water supplies.

BACKGROUND OF THE INVENTION

A universal tool which can control the water supply plumbing during repairs wherever the problem is located is greatly needed. Presently, miscellaneous tools are used and one must know where the problem is located in order to know what type of tool and which municipal department should be called. Presently, a plumber may be contacted regarding leaky plumbing. By the time he determines where the problem area is and determines what tools may be needed, substantial water damage has already occurred. At the present time, the plumber must determine the location of the leak. If the water supply should be turned off within building, one type of tool is required. If the water supply must be turned off at the street, another tool is required. If the water supply must be turned off at the street or fire hydrant, Emergency Services must be called in most cities. Therefore, minimizing the amount of time required to get the proper tool in the selected location will minimize water spillage and damage from any given water supply problem.

At present, when a fire hydrant is damaged, as when a motorist drives over a hydrant, water gushes out. If the fire department is called, and if a fire engine is first on the scene, there are typically no tools or inadequate tools available to shut off the utility water supply. The fire hydrant can be turned off by the fire department, but the utility water controls require a different tool because the fixture turning the water and off is different than on a fire hydrant. The municipal water supplier is then called to turn off the utility water valve. By the time the municipal water supplier truck arrives at the scene with the utility shut off tool, large amounts of water have been released into the streets.

SUMMARY OF THE INVENTION

The present invention includes a bar on which two different types of tools are formed on each end. The first tool may be, for example, a tool designed to fit a fire hydrant and the second tool may designed to fit a utility water supply control valve. Rings are provided, either integrally formed or welded to first and second tools so that a bar can be inserted to add substantial torque to open and shut the fixtures wherever they are located.

BRIEF DESCRIPTION OF THE DRAWINGS

FIG. 2 is a side view of the present invention;

FIG. 3 is an side view of the present invention rotated 90 degrees from FIG. 2;

FIG. 4 is an enlarged side view of the present invention;

FIG. 5 is an isometric view of one portion of the present invention

DESCRIPTION OF THE PREFERRED EMBODIMENTS

Figure 1:
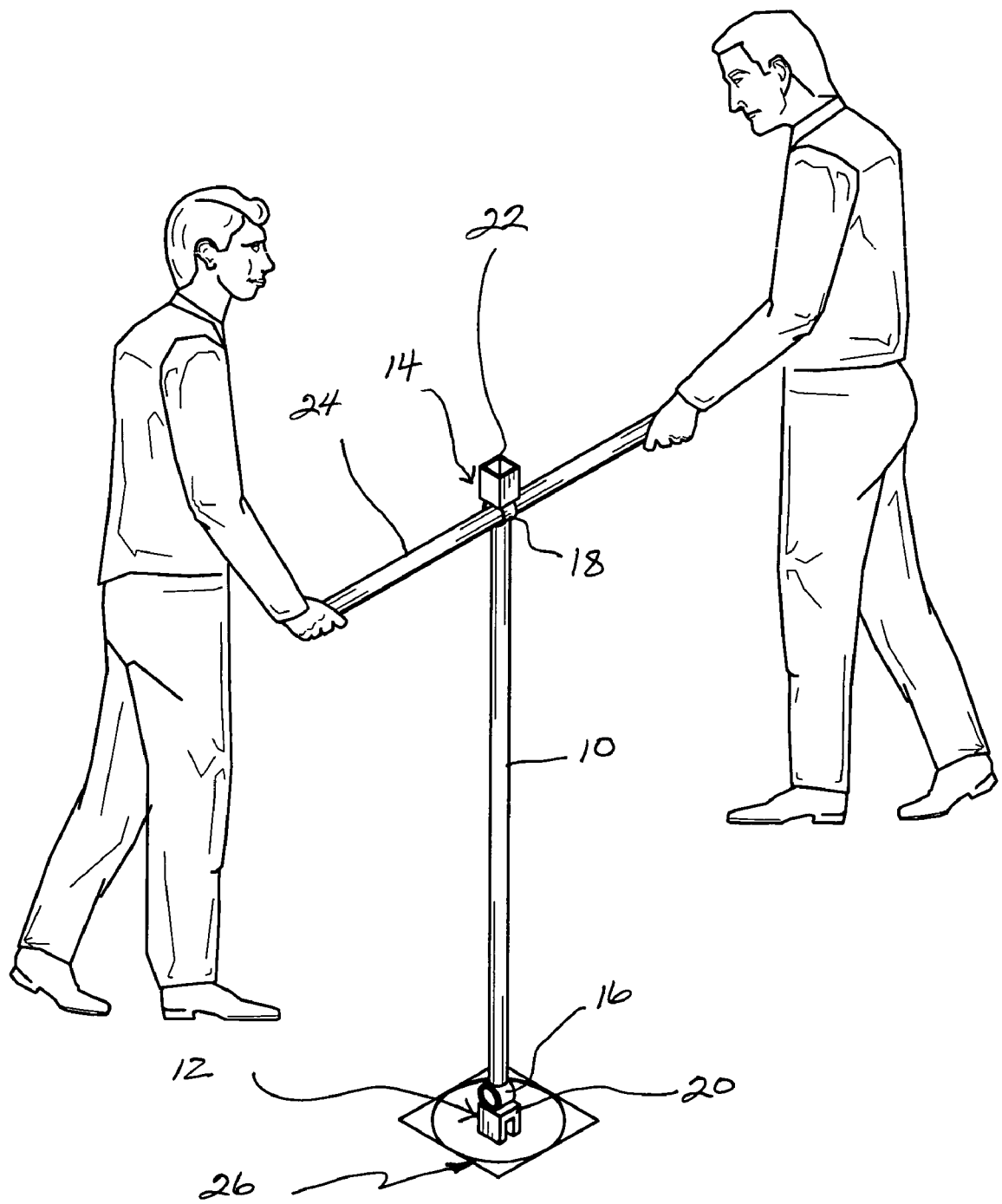
FIG. 1 is perspective view of the present invention in use.

A preferred embodiment of the present invention includes a cylindrical bar 10 with two different tools on opposing ends 12 and 14 of the bar as shown in FIG. 1. In one of the preferred embodiments, a generally U-shaped member 20 is connected to the first end 12 of the bar 10 for controlling one type of municipal water supply shut-off valve. Another tool, such as the four-sided, square-shaped fitting 22 will turn a second fixture for controlling the water pipes permitting the water flow to be turned off and on. The first member 20 is on the opposing end 12 of the bar 10 from the second member 22. The second member 22, shown as a socket wrench in FIGS. 1–4 serves as a water supply shut-off valve for a fire hydrant in some localities, but variously-shaped wrenches may be used depending on the circumstances.

It is necessary in most instances to have a substantial amount of torque applied to remove the clamping device, which is typically a nut and bolt combination. In one of the preferred embodiments, rings 16 and 18 are connected to the bottom side of each too. The ring 16 is connected to upper surface of the first tool and ring 16 is placed between the second tool 22 and the ring 18. A rod 24 may then be inserted into the ring so that torque can be applied to the tool for turning the nut on the water supply fixture 26 as shown in FIG. 1. The fittings may be any other shape, such as hexagonal, to fit the needs of each locality.

The following describes a typical operating procedure for the present invention: Water is leaking out of the underground utility control site. A call is made to Emergency Services and The closest available vehicle having the present invention is dispatched. The fire department officers determine that it is best to shut the water off at the underground utility site which controls the hydrant. In large cities, the utility control valves are typically located underground and must be opened using a pick ax (vandals are thereby prevent from disturbing the valves unless they have pick axes and know where to look). Once the water supply valves are accessed, there are written codes which Emergency Service personnel can read advising them of the correct number of turns and the direction to turn the valve to shut off the water supply. The appropriate member on one side of the bar is placed around the valve and turned. The rod 24 is placed inside the ring. One or more people hold opposing ends of the bar and turn, applying substantial torque on the fixture rapidly closing off the water supply as shown in FIG. 1.

It will be appreciated by those skilled in the art, that the tool may be manufactured in a variety of ways with a various materials. The ring and each tool may be integrally formed as one unit or they may be welded as shown in FIG. 5. It also advantageous to have each tool variable in width and dimensions so that a number of different sizes of water supply control valves may be used by the same tool. Although there is a standard set by the (U.S.) National Fire Protection Association (NFPA), numerous cities do not follow the standard. The present invention is designed to be universal so that each government entity can determine which tools are necessary for the particular locality.

For example, in the embodiment shown in FIGS. 1–5, U-shaped member 20 may be designed to vary the width "W" (as shown FIG. 5) of the tool. The U-shaped member may be formed by two L-shaped parts with the bottom of the "L" in the first part placed on top of the bottom of the "L" in the second part. Holes may be drilled in the first "L " and tapped to receive a bolt. The second "L " may have slots drilled. The bolt is then inserted through the two "L " shaped members and placed in the desired location along the length of the slot. A shim may also be inserted within member 20 or member 22 to vary the size of the wrench. The Wrench may have a worm gear similar to a conventional hand-held wrench to vary the width. The wrench may be formed such that the walls have a number of pre-determined widths forming steps to accommodate the various sizes of water control valves used by different municipalities. It will be appreciated that the size may be made variable in a number of different ways.

The present invention may be readily stored on many different types of vehicles, including fire engines, fire trucks, water utility vehicles, vans and trucks.

I claim:

1. A device for controlling at least two underground water supplies, each water supply secured by a first and second clamping mechanism, said device comprising:
   a bar having a diameter;
   a rod adapted to receive said bar and to reach underground water supplies, said rod having a first and second end;
   a first wrench for mating with the first water supply clamping means, said first wrench connected to said first end of the rod;
   a second wrench for mating with the second water supply clamping means, said second wrench connected to said second end of said rod;
   a first ring adapted to receive said bar, said ring having a diameter greater than said bar diameter, said ring interposed adjacent to said first wrench;
   a second ring adapted to receive said bar, said ring having a diameter greater than said bar diameter, said ring interposed adjacent said second wrench wherein said bar is placed inside one of said rings generally bisecting said bar into a first end and a second end, and one person applies torque to said first end of said bar and a second person applies torque to said second end of said thereby turning said bar in a circular motion.

2. A device for controlling at least two underground water supplies in accordance with claim 1 wherein at least one of said wrenches is of variable width.

* * * * *